(12) United States Patent
Huang et al.

(10) Patent No.: US 8,392,605 B2
(45) Date of Patent: Mar. 5, 2013

(54) METHOD OF FAST-MULTICAST AND A SYSTEM THEREOF

(75) Inventors: Jinhong Huang, Shenzhen (CN); Mingyi Wang, Shenzhen (CN); Yong Kong, Shenzhen (CN); Bo Wu, Shenzhen (CN)

(73) Assignee: ZTE Corporation (CN)

( * ) Notice: Subject to any disclaimer, the term of this patent is extended or adjusted under 35 U.S.C. 154(b) by 856 days.

(21) Appl. No.: 11/909,225

(22) PCT Filed: Oct. 17, 2005

(86) PCT No.: PCT/CN2005/001695
§ 371 (c)(1),
(2), (4) Date: Jun. 22, 2010

(87) PCT Pub. No.: WO2006/099782
PCT Pub. Date: Sep. 28, 2006

(65) Prior Publication Data
US 2010/0260178 A1  Oct. 14, 2010

(30) Foreign Application Priority Data

Mar. 21, 2005 (CN) .......................... 2005 1 0056424

(51) Int. Cl.
*G06F 15/173* (2006.01)
(52) U.S. Cl. ........ 709/238; 709/239; 709/240; 709/242; 370/256; 370/390; 370/432
(58) Field of Classification Search .......... 709/238–242; 370/256, 390, 432
See application file for complete search history.

(56) References Cited

U.S. PATENT DOCUMENTS

| | | | |
|---|---|---|---|
| 6,917,983 B1* | 7/2005 | Li ................................. | 709/238 |
| 7,933,267 B1* | 4/2011 | Aggarwal et al. ............. | 370/389 |
| 2002/0091846 A1* | 7/2002 | Garcia-Luna-Aceves et al. ............................ | 709/230 |
| 2002/0150094 A1* | 10/2002 | Cheng et al. .................. | 370/389 |
| 2002/0150099 A1* | 10/2002 | Pung et al. .................... | 370/390 |
| 2005/0044356 A1* | 2/2005 | Srivastava et al. ............ | 713/163 |

(Continued)

FOREIGN PATENT DOCUMENTS
CN  1378365 A  11/2002
(Continued)

*Primary Examiner* — Wing F Chan
*Assistant Examiner* — Hitesh Patel
(74) *Attorney, Agent, or Firm* — Brooks Kushman P.C.

(57) ABSTRACT

The present invention discloses a method for implementing fast multicast and a system thereof. The system comprises multicast protocol, forwarding plane and fast multicast control plane, and the fast multicast control plane further comprises management module and agent module. The method comprises steps of: determining an edge node of time domain overlapping sub-tree of corresponding multicast tree in the multicast service according to the analysis of time domain; initiating the static multicast member of multicast service on said edge node, so that an interface at which the static multicast member is initiated generates a requirement for multicast service; generating the multicast overlapping sub-tree from said edge node to a multicast root node, so that the multicast service flow is transmitted to said edge node in advance; after sending out the requirement for the multicast service flow through any receiver at said edge node, multicast tree path establishes a multicast forwarding tree from the receiver to the edge node, the multicast service flow will be transmitted from this edge node to the receiver. The present invention can effectively reduce the delay of multicast application.

16 Claims, 2 Drawing Sheets

U.S. PATENT DOCUMENTS

| | | | |
|---|---|---|---|
| 2005/0129017 A1* | 6/2005 | Guingo et al. | 370/390 |
| 2005/0201278 A1* | 9/2005 | Banerjee et al. | 370/229 |
| 2005/0201406 A1* | 9/2005 | Sekine et al. | 370/432 |
| 2006/0187950 A1* | 8/2006 | Bou-Diab et al. | 370/432 |
| 2007/0136759 A1* | 6/2007 | Zhang et al. | 725/62 |

FOREIGN PATENT DOCUMENTS

| | | |
|---|---|---|
| CN | 1466340 A | 1/2004 |
| EP | 1865661 A1 * | 12/2007 |
| KR | 2003094465 B1 | 12/2003 |

* cited by examiner

METHOD OF FAST-MULTICAST AND A SYSTEM THEREOF

TECHNICAL FIELD

The present invention refers to a multicast system and the realization of multicast in a network.

TECHNOLOGY BACKGROUND

The multicast technology effectively solves the problem of "single-point sending & multi-points receiving" and realizes efficient point-to-multipoint data transmission in the network and therefore highly saves network bandwidth and reduces network load. As a communication method that is parallel to unicast and broadcast, the significance of multicast is not limited thereto. What's more, by utilizing multicast characteristics of the network, it can conveniently offer some new value-added services (VAS), including Internet information services such as live online, digital TV, network TV, distance learning, telemedicine, network radio station and real-time video conference, and the like.

As regards to routing equipments, the network multicast protocols mainly include intra-domain multicast protocol such as PIMSM, PIMDM, DVMRP and the like, and inter-domain multicast protocol such as MSDP and the like. Characteristics of the multicast protocols that they are generated as required or maintain the multicast routing according to requirements can theoretically save network bandwidth and also keep the multicast protocol operating normally under complicated dynamic network environment. However, in practical applications there exists problem of relatively low application timeliness.

Taking the current IPTV as an example, the data bearer routing protocol of IPTV is a multicast protocol. However, the subscribers of IPTV require that the immediacy of watching programs in IPTV should not have an evident difference compared to traditional TV, which means that the terminal user can receive the requested program soon after sending out an application request. Moreover, when the subscriber is switching between different IPTV programs, the switching delay should be also within the range that human beings can bear. The above demands, when reflected onto the multicast protocol, require the multicast protocol to ensure that the delay from initiating a specific multicast application demand to receiving multicast service data by the starter can be as short as possible. The present multicast protocols can not meet these requirements in the applications.

In a routing environment with more than five hops, we tested IPTV forwarding based on PIMSM multicast protocol and its delay time is 1-7 seconds, and when the network environment gets more complicated, the delay time will be longer. The reason that leads to the delay can not be totally avoided by the multicast protocol itself. Since no matter either the multicast protocols DVMRP and PIMDM with "Broadcast and Prune" multicast routing formation and maintenance scheme or the protocol PIMSM with "display Join/Prune" multicast routing formation and maintenance scheme is employed, there always exists a multicast application delay time for the process from initiating a specific multicast demand to receiving the needed multicast service flow.

In DVMRP and PIMDM protocols, provided the delay time for Graft message from leaf router to source-direct-connect router is Graft_Delay, and the transmission time for multicast data message from source to leaf router is M_Traffic_Delay, therefore we have: $0<\text{Delay} \leq \text{Graft\_Delay} + \text{M\_Traffic\_Delay}$, wherein Graft_Delay and M_Traffic_Delay are proportional to the transmission distance (the number of hops).

In PIMSM, assuming that the transmission delay time for Join message from leaf node to RP (Rendezvous Point) is Join_Delay; the transmission time for multicast data message from RP to leaf node is M_Traffic_Delay; the inhibition cycle of the register is T_Register (Time_Register), therefore the multicast application delay time of PIMSM satisfies the following relationship: $0<\text{Delay} \leq \text{Join\_Delay} + \text{T\_Register} + \text{M\_Traffic\_Delay}$, wherein Join_Delay and M_Traffic_Delay are proportional to the distance (the number of hops) from the leaf node to RP. T_Register is related to the configuration of the Register timer, in which the default value is 60s. Because of said existing problems, if we use current multicast protocols, under the application environment which requires real-time processing, such as IPTV, the demands can not be met.

SUMMARY OF THE INVENTION

The technical problem needs to be solved in the present invention is to propose a method of fast multicast that can effectively reduce the multicast application delay based on the original multicast protocol. The technical problem is targeted for the real-time application demands from some multicast services. The present invention also needs to provide a fast multicast system that can realize the method.

The multicast application delay is generated due to the randomness of multicast application requirements in the time domain. Considering the randomness of the application requirements and also from the perspective of bandwidth saving, the multicast protocol enables multicast transmission to be triggered or maintained according to the multicast requirement applications.

However, for the applications such as live online, digital TV, network TV and network radio station etc., they have their own characteristics in multicast application type. From the perspective of users, the multicast application demands are random within the time domain, but from the entire analysis of the application needs of all the users, the closer the logical topology (multicast spanning tree) of each type of multicast application gets to the root in the network, the more overlapping it becomes in the time domain. Even though this overlapping will have random discrete phenomenon in some time periods in multicast application time domain, for this type of application such as IPTV with the characteristic of weak broadcast, the discrete time period occupies a small portion from the perspective of entire time domain. Above a certain level of multicast spanning tree, the demand for time domain discrete randomness gets weak. In the traditional dynamic multicast method, small portion of these discrete points will lead to demolition and reconstruction of a huge multicast tree, resulting in a multicast delay definitely. The bigger the reconstructed multicast tree is, the longer the multicast delay will be. What's more, in the present network, the large scale multicast service usually possesses the above features.

Based on the above analysis, the present invention provides a method of fast multicast which comprises the following steps:

(a) determining an edge node of time domain overlapping sub-tree of the multicast tree corresponding to the multicast service according to the analysis of time domain;

(b) initiating the static multicast member of multicast service on said edge node, so that the interface at which the static multicast member is initiated generates a requirement for this multicast service;

(c) generating the multicast overlapping sub-tree from said edge node to a multicast root node, so that the multicast service flow is transmitted to said edge node in advance;

(d) after the multicast tree path sends out the requirement for the multicast service flow through any receiver at said edge node, a multicast forwarding tree is set from the receiver to the edge node, the multicast service flow will be transmitted from this edge node to the receiver.

Additionally, the above method also possesses the following characteristic: said multicast tree is a multicast shared tree and what is initiated on said edge node is the static shared tree multicast member.

Additionally, the above method also possesses the following characteristic: said multicast tree is a multicast source tree. Said edge node supports source specific multicast and what is initiated is the static source tree multicast member.

Additionally, the above method also possesses the following characteristic: said multicast tree is a multicast source tree. What is initiated on the edge node in said step (b) is the static shared tree multicast member. The interface at which the multicast members are initiated generates a requirement for multicast shared tree service; moreover, between step (b) and step (c) it also comprises the following steps: triggering the generation of the multicast shared forwarding tree from said edge node to the root node of multicast shared tree through the requirement for multicast shared tree service, so that the multicast shared tree service flow is transmitted to said edge node in advance, and after that, initiating a switch from multicast shared tree to multicast source tree by said edge node, so that a source overlapping sub-tree from said edge node to the source of the multicast source tree is formed.

Additionally, the above method also possesses the following characteristic: the static multicast member in said multicast service is statically configured on the edge node of the time domain overlapping sub-tree of the multicast tree corresponding to said multicast service. It initiates said static multicast member in the valid time period and cancels said static multicast member in other time periods.

Additionally, the above method also possesses the following characteristic: said step (a) can be further divided into the following steps of:

(a1) setting a fast multicast management module in multicast network and also setting a fast multicast agent module on each multicast router;

(a2) after initiating said management module and said agent module, establishing an inter-connection as well as a fast multicast system group;

(a3) monitoring the time domain distribution of the multicast service on the current node and reporting to the management module the time domain monitoring result of the multicast service periodically by the individual agent module in said group;

(a4) after the management module receives the time domain monitoring result of the multicast service, it determines the edge node of each multicast service in the next cycle and saves it.

Additionally, the above method also possesses the following characteristic: said step (b) can be further divided into the following steps of:

(b1) comparing the edge node of the multicast service in the current cycle with that in the following cycle by said management module, obtaining the edge nodes that will be invalid in the following cycle and the new ones that will be added;

(b2) notifying the agent module on said new-added edge nodes to initiate the static multicast member of the corresponding multicast service by said management module, and notifying the agent module on said will-be-invalid edge nodes to cancel the static multicast member of the corresponding multicast service;

(b3) executing the corresponding operations when said agent module receives the notification of either initiating or canceling the static multicast member of the corresponding multicast service and determines that said static multicast member hasn't been initiated or cancelled yet.

Additionally, the above method also possesses the following characteristic: on said management module, a mapping table including the corresponding relationship among multicast service, edge node, and connection is established. In said step (b1), based on the determined edge node of each individual multicast service in the next cycle, said management module compares with the mapping table and obtains the edge nodes that will be invalid in the following cycle and the new ones that will be added, then updates the mapping table;

Additionally, the above method also possesses the following characteristic: when said management module closes, it saves current mapping table; when the management module, Manager, restarts and builds up the connection with agent module, based on the saved edge node information in the mapping table, it notifies the agent module of these edge nodes to initiate the static multicast member of the corresponding multicast service in the table.

Additionally, the above method also possesses the following characteristic: in said step (a2), the management module in the multicast network multicasts management notification information periodically, and the information comprises IP address and live time information of the management module. When said multicast router receives said notification information, it forwards the message and meanwhile its agent module controls the establishment of the connection with said management module. In step (a3), said agent module only monitors and reports the time domain distribution during the life period of said management module and when the connection with it is normal.

Additionally, the above method also possesses the following characteristic: said static multicast member is initiated on the loopback interface.

Based on the above analysis, the present invention also provides a fast multicast system which comprises a multicast protocol and a forwarding plane, characterized in that it also includes a fast multicast control plane, which further comprises a management module and an agent module, wherein:

said management module exists in the fast multicast management server of the system and it is used for the control and management of the fast multicast system. It determines the edge node of the time domain overlapping sub-tree of the multicast tree and also initiates the static multicast member of the multicast service on said edge node;

said agent module exists in all the multicast routers that join the fast multicast system, and it is used to execute the fast multicast instructions of said management module as well as to feedback to the management module the time domain monitoring information of the multicast service of this node after the connection with the management module has been established.

Additionally, said system also possesses the following characteristic: said management module comprises:

an edge node determination unit used to determine the fast multicast edge node of each individual multicast service in the following cycle according to the received time-domain-monitoring-result of each agent module for the multicast service within the current cycle;

a mapping management unit used to save the corresponding relationship among multicast service, edge node and the connection with the agent module, update the corresponding relationship in real time based on the determination result for the edge node, and obtain the edge nodes that will be invalid in the following cycle and the new ones that will be added by way of comparison;

a static multicast member control unit used to send control information for deleting static multicast member to the will-be-invalid edge nodes within the current cycle, and send control information for initiating static multicast member to the new added edge nodes.

Additionally, said system also possesses the following characteristic: said agent module comprises:

a connection establishment unit used to connect to said management module when the multicast service is initiated;

a time domain monitoring unit used to monitor the time domain distribution of the multicast service on the current multicast router during the life period of said management module when the connection established between agent module and management module is normal, and report to said management module the time domain monitoring result of the multicast service within the current cycle periodically;

a static multicast member configuration unit used to initiate the corresponding static multicast member when the control information for initiating static multicast member has been received but the static multicast member of said multicast service has not been initiated yet; to delete corresponding static multicast member or set it invalid when the control information for deleting static multicast member has been received and the static multicast member of said multicast service has been initiated already.

Additionally, said system also possesses the following characteristic: said management module also comprises a notification information sending unit, which is used to send management module notification information to all the multicast configuration interfaces by using the multicast addresses of the multicast router as the destination addresses in the multicast network periodically. The unit also notifies all the routers in the multicast service network when the management module closes.

Additionally, said system also possesses the following characteristic: said agent module initiates the static shared tree multicast member on the loopback interface.

Additionally, said system also possesses the following characteristic: said edge node determination unit is also used to notify the agent module of these edge nodes to initiate the static multicast member of the corresponding multicast service based on the saved edge node information when said management module is restarted.

Compared with the existing multicast, and in the application environment that has relatively rich bandwidth and has a higher demand for high speed, the present invention can offer faster multicast service for the receiving end through the determination of the edge node and the initiation of the static multicast member on this node. This invention also possesses characteristics such as easy realization and good compatibility with current multicast protocols.

PREFERRED EMBODIMENTS

The traditional PIM-SM multicast originally employs the service model of ASM (Any Source Multicast), and the shared tree and RP procedure use (*, G) group pair to represent a multicast session, wherein (G) represents the address of a specific IP multicast group, while (*) represents any source that is sent to the multicast group G.

PIMS-SM protocol can also employ SSM (Source Specific Multicast), which only needs to add a corresponding functional module on the node equipments (namely multicast routers). SSM mode is a new service model that is different from traditional multicast. SSM directly establishes a shortest multicast path tree identified by (S, G), wherein (G) represents the address of a specific IP multicast group, while (S) represents the IP address of the specific source sent to the multicast group G. A (S, G) pair of SSM is also named as "Channel".

Three examples of the present invention under two multicast environments will be described respectively in the following.

The First Embodiment

This embodiment realizes the fast multicast by using a fast multicast system to initiate the static shared tree multicast member Igmp_static_member (*, G) at the fast multicast edge node in the multicast shared tree environment (*, G).

Figure 1:
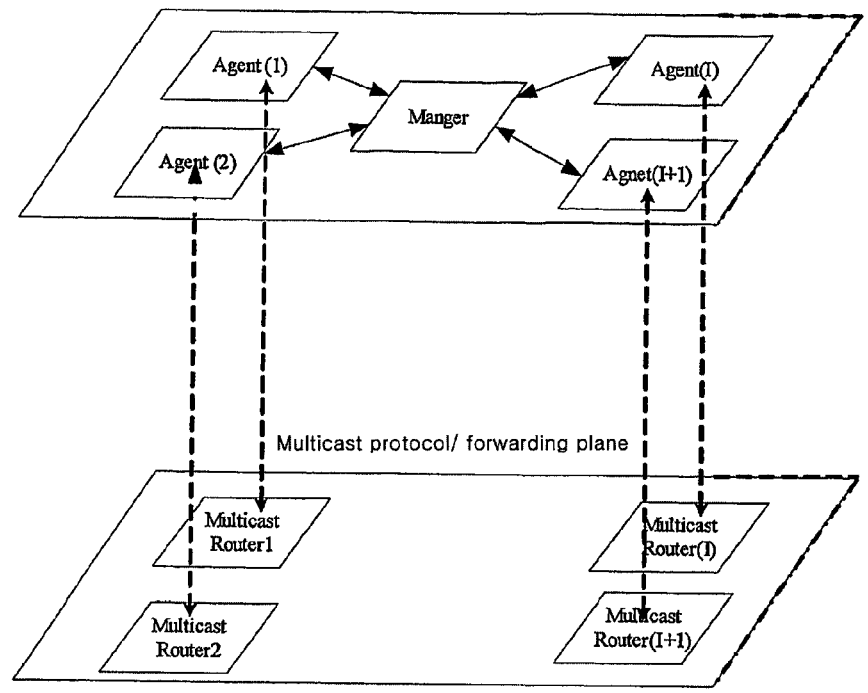
FIG. 1 is a logical configuration diagram of a fast multicast system.

The fast multicast system mainly comprises two planes, one is multicast protocol and forwarding plane, and the other is fast multicast control plane, as shown in FIG. 1.

The multicast protocol and forwarding plane is composed of original multicast protocol and forwarding system in multicast network. It performs corresponding operations under the control of fast multicast control plane to realize fast multicast.

The fast multicast control plane comprises two parts: the management module Manager and the agent module Agent added in the multicast network. Manager exists within the fast multicast management server (it uses the logical definition in the text, and in fact it can be united with routers) and is mainly responsible for the control and management of the fast multicast system. It determines the edge node of the time domain overlapping sub-tree of the multicast tree and initiates the static multicast member of the multicast service on said edge node. Agent exists in all the multicast routers that join the fast multicast system. It is mainly responsible for executing the fast multicast instructions of Manger as well as to feedback to the Manger the time domain monitoring information of the multicast service of the node.

The static multicast member refers to a group member of the multicast tree generated on the interface of the multicast router Router. This group member has the same function as those members generated by Igmp protocol have, and possesses static characteristics, and it will always be valid as long as it is not be designed to be deleted.

In the present embodiment, the multicast tree is a multicast shared tree and the multicast member is a shared tree multicast member. The steps for realizing fast multicast under shared tree environment are as follows:

step A1, before the request for multicast shared tree service is launched, the fast multicast Manager finds out the edge node of the time domain overlapping sub-tree of the multicast shared tree based on the time domain analysis for said multicast service shared tree in the previous service cycle;

step B1, through the interaction between Manger and Agent, the fast multicast system enables the static shared tree multicast member Igmp_static_member (*,G) on the loopback interface that is applied by Agent on said node. Because of the multicast member, the loopback interface at which said multicast member is initiated generates a request for the multicast shared tree service;

Loopback interface is the logical interface of the router; when the router is Active, it will always be Active.

step C1, the request from multicast shared tree service triggers the generation of the multicast shared overlapping sub-tree from said edge node to the shared tree multicast root node. The multicast shared tree service flow will be transmitted to said edge node in advance;

step D1, after sending out the request for multicast shared tree service flow M_Traffic (*, G) through any receiver on said edge node, the multicast shared tree path builds up the multicast forwarding tree from said receiver to said edge node, and the multicast shared tree service flow is transmitted from said edge node to the receiver.

Figure 2:
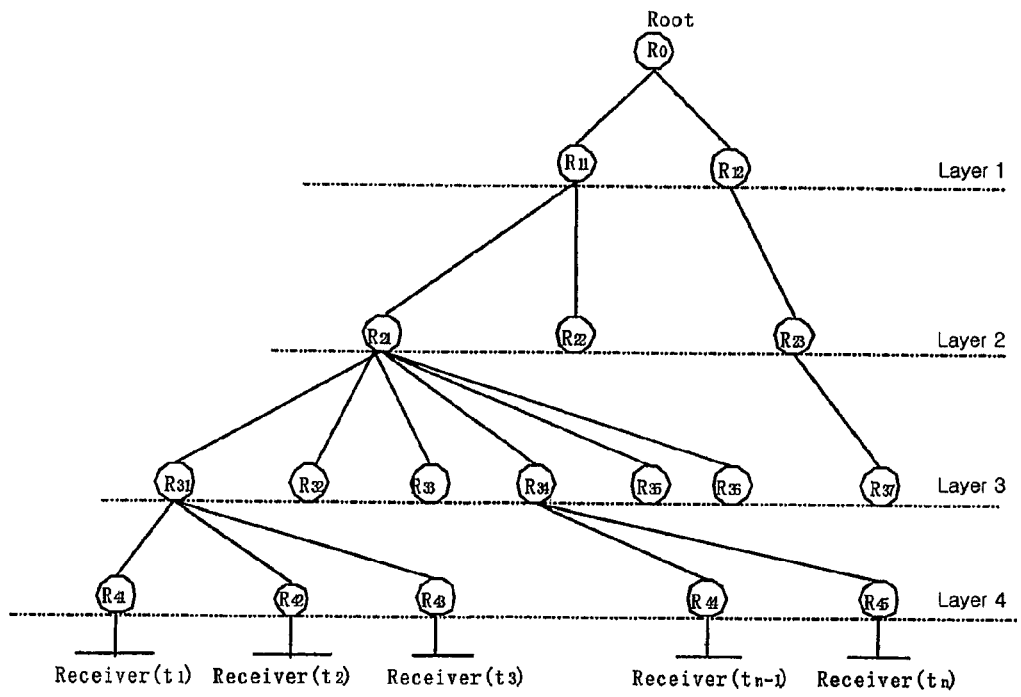
FIG. 2 is a stretched-out view of the multicast shared tree in time domain.

The fast multicast realization of (*, G) multicast shared tree of PIMSM protocol will be illustrated by using an application example in the following. FIG. 2 is a stretched-out time domain diagram of a multicast shared tree of a certain multicast service G in a fast multicast service cycle. Receiver $(t_1)$~Receiver $(t_n)$ represent n receivers that have initiated the multicast shared tree application requests at the moments of $t_1, t_2 \ldots t_{n-1}, t_n$ respectively. All the n receivers are the fast multicast application applicants for the multicast service G in the current service cycle. Root is the root node of the multicast shared tree. The proposed requirements for fast multicast applications include: each individual Receiver wishes to receive the multicast shared tree service flow soon after sending out the request of multicast shared tree service flow M_Traffic (*,G).

The multicast shared forwarding trees of (*, G) at every moment are as follows:

1. The multicast shared forwarding tree of (*, G) at moment $t_1$ is: $R_0 \to R_{11} \to R_{21} \to R_{31} \to R_{41}$.
2. The multicast shared forwarding tree of (*, G) at moment $t_2$ is: $R_0 \to R_{11} \to R_{21} \to R_{31} \to R_{42}$.
3. The multicast shared forwarding tree of (*, G) at moment $t_{n-1}$ is: $R_0 \to R_{11} \to R_{21} \to R_{34} \to R_{44}$.
4. The multicast shared forwarding tree of (*, G) at moment $t_0$ is: $R_0 \to R_{11} \to R_{21} \to R_{34} \to R_{45}$.
5. The multicast shared forwarding tree of (*, G) at moment $t_{n+1}$ will not cover the multicast forwarding path $R_0 \to R_{11} \to R_{21}$ any more.

By analyzing the multicast forwarding trees at moments of $t_1$~$t_{n+1}$, it can be found that each forwarding tree is overlapping on the part $R_0 \to R_{11} \to R_{21}$. When the earliest application time for (*, G) is obtained either by the earliest application time $t_1$ in the previous service cycle or other ways, we can then believe that the part $R_0 \to R_{11} \to R_{21}$ of the multicast shared forwarding trees falls into the time period $t_1$~$t_{n+1}$, and $R_{21}$ is the edge network node of the time domain overlapping sub-tree of the multicast shared tree. The fundamental purpose of edge node determination is to push the multicast source and RP to the nodes that are much closer to the users.

Even if there is termination of multicast application requests during the time period of $t_1$~$t_{n+1}$, it is not necessary to think about it when n is very large (there are lots of random users) and if the termination time period occupies a small portion in the entire time period of $t_1$~$t_{n+1}$. The routing table of the multicast shared tree is always maintained at $R_0 \to R_{11} \to R_{21}$, and the multicast shared tree service flow is enabled to be forwarded to the router $R_{21}$ along the path $R_0 \to R_{11} \to R_{21}$ at any moment.

Figure 3:
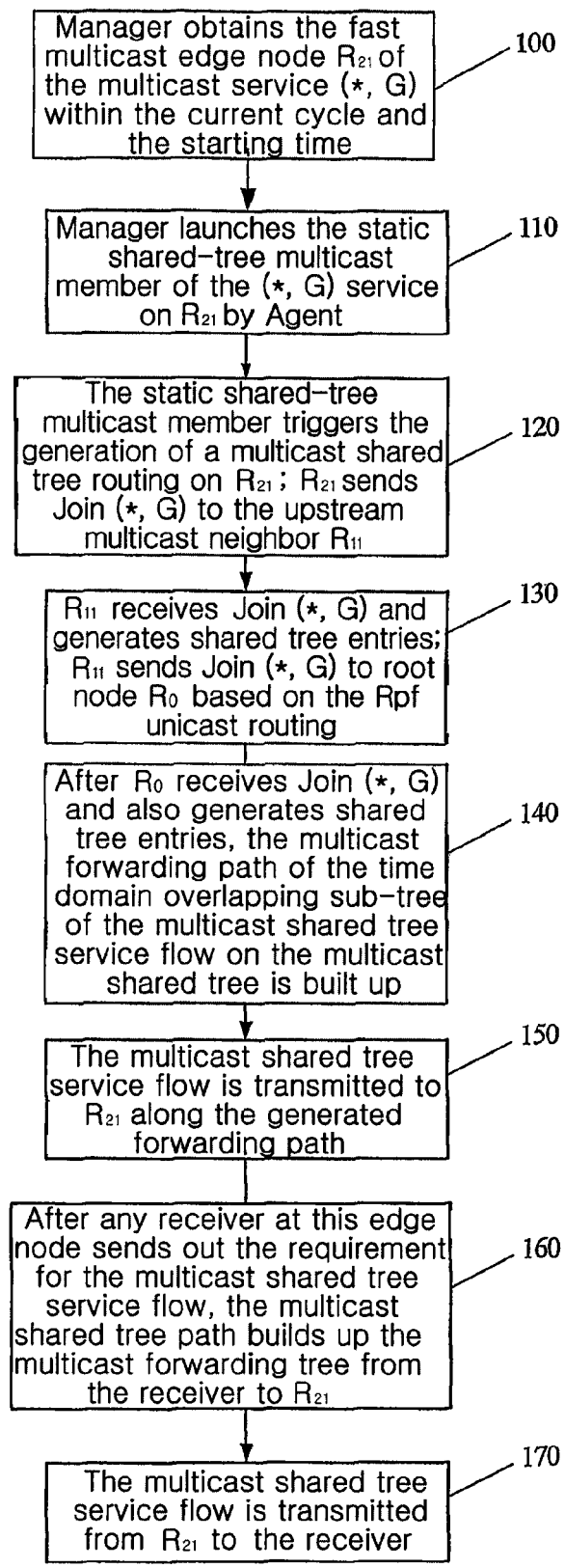
FIG. 3 is a flow chart of realizing fast multicast with the multicast shared tree of PIMSM multicast protocol to be the illustrational environment in the first embodiment of the present invention

As for the multicast shared tree in FIG. 2, assuming that the edge node determined in every cycle during time period of $t_1$~$t_{n+1}$ is all $R_{21}$, then as shown in FIG. 3, the flow of realizing fast multicast in the present application example comprises the following steps of:

step 100, based on the time domain situation of multicast tree of the multicast service (*, G) collected from each Agent in the last fast multicast service cycle, the fast multicast system Manager obtains the fast multicast edge node $R_{21}$ of multicast service (*, G) in the current cycle as well as the starting time;

step 110, Manager informs the fast multicast Agent on $R_{21}$ to initiate the static shared tree multicast member Igmp_static_member (*, G) of the multicast service (*, G).

step 120, the static shared tree multicast member triggers the generation of the multicast shared tree routing on $R_{21}$ which sends the join request Join (*, G) of multicast shared tree to its upstream multicast neighbor $R_{11}$;

step 130, $R_{11}$ receives Join (*, G) and generates a shared-tree routing entry. $R_{11}$ sends Join (*, G) to the root node $R_0$ according to the Rpf unicast routing;

step 140, after the root node $R_0$ has received Join (*, G) and generates a shared-tree routing entry, the multicast forwarding path $R_0 \to R_{11} \to R_{21}$ of the time domain overlapping sub-tree of multicast shared tree service flow on the multicast shared tree is established;

step 150, the multicast shared tree service flow is transmitted to $R_{21}$ from the generated forwarding path $R_0 \to R_{11} \to R_{21}$, thus, before the receiver Receiver launches the request for multicast shared tree service, a forwarding tree from the root node $R_0$ to the edge node $R_{21}$ of multicast service is firstly established;

step 160, after sending out the request for multicast shared tree service flow through any receiver Receiver on said edge node, the multicast shared tree path builds up the multicast forwarding tree from Receiver to $R_{21}$;

step 170, the multicast shared tree service flow is transmitted from $R_{21}$ to this receiver Receiver.

It can be seen that the interface which has been configured with static shared tree multicast member Igmp_static_member (*, G) maintains the demand for multicast shared tree service during the period of the existence of the configuration of the member, thus maintaining the multicast shared overlapping sub-tree that has been formed. The maintenance of the multicast shared overlapping sub-tree ensures that the multicast shared tree service flow can always be transmitted to the edge node of the multicast shared overlapping sub-tree. When any receiver of Receiver $(t_1)$~Receiver $(t_n)$ initiates the application request for multicast shared tree service flow, the multicast shared forwarding tree only needs to establish downwards from $R_{21}$, and what's more, the transmission distance (the number of hops) and the delay of multicast shard tree service will also be reduced, therefore shortening the multicast application delay and achieving the goal of fast multicast.

The following part further explains the details of how the fast multicast system in the present embodiment determines the edge node of the time domain overlapping sub-tree in multicast tree according to the interaction between Manager and Agent as well as the time domain analysis of the multicast service. The process comprises the following steps of:

step 1, the fast multicast management server initiates the function of fast multicast Manager. Manager sends Manager notification information to all the multicast configuration interfaces by using the multicast address 224.0.0.2 of the multicast router as the destination address, namely to multicast the information within the field, and the information includes the IP address of Manager, Manager life time, etc..

step 2, when Agent of the multicast router receives the notification information of Manager, Agent will first perform RPF (reverse path forward) check for the information in order to avoid the formation of information loop, and if the check fails, it would be discarded directly, otherwise, the next step would be executed;

step 3, Agent of the multicast router uses 224.0.0.2 as the destination address to forward the Manger notification information to all the multicast configuration interfaces except the receiving ports; meanwhile, if said router has fast multicast Agent and the multicast has been initiated, then TCP connection is build up between its Agent and the fast multicast TCP Server on Manager;

By performing the above steps, the determination and notification of the fast multicast system Manager as well as the establishment of the fast multicast system group are completed. The present embodiment employs a dynamic manner, namely to notify all Agents through hop-by-hop forwarding. In another embodiment, the determination of the fast multicast system Manager can also be done by a static method, namely to statically appoint Manager in all Agents. After the router launches the multicast, Agent establishes the TCP connection with Manager. If the connection establishment fails, then the connection is restarted after the rebuilding timer expires, until the connection is established successfully or the Manager is timeout.

step 4, each Agent in the fast multicast system is responsible for monitoring the time domain distribution of the multicast service on the present multicast router, and informing Manger in the fast multicast system of the time domain monitoring result of the multicast service in the current cycle periodically (a fast multicast service cycle); the monitoring result refers to which multicast services are launched in the cycle and the life time of the existing multicast service;

step 5, after receiving the time domain monitoring result of the multicast service of each Agent, Manager determines the fast multicast edge node of each individual multicast service in the next cycle. By comparing with the established mapping table that comprises the corresponding relationship among multicast service, edge node (identified with the IP address of Agent) and TCP connection, Manger obtains edge nodes that will be invalid and the newly added edge nodes in the next cycle and then updates the table;

When determining the edge node, it can first set a threshold variable P, whose value is set as required when used by the fast multicast system. It first computes all the nodes of the multicast time domain overlapping sub-tree in the multicast service G within the current cycle, obtaining the ratio L of time for each node to become the node of the multicast time domain tree of G to the entire cycle. When the value L of node n is bigger or equal to P and the values of Ls of the sub-nodes of node n are all less than P, the node n is chosen as the fast multicast edge node of the multicast time domain overlapping sub-tree for multicast service G in the next cycle.

step 6, when the next cycle starts, Manager sends the control information for initiating static multicast member to Agent of each newly added edge node and sends the control information for canceling static multicast member to Agent of the original invalid edge nodes; the information includes group addresses, multicast source address, operation flags and so on. The operation flags are used to distinguish whether to "initiate" or "cancel" the static multicast member;

step 7, after Agent receives said control information, if the operation flag is "initiate" and the static multicast member of said multicast service is not initiated on the loopback interface, then the corresponding static multicast member is initiated on the interface; if the operation flag is "delete" and the static multicast member of said multicast service has been initiated on the interface, then the initiated static multicast member is deleted or set as invalid, while under other situations, it does not perform any operation;

Through the above steps, a fast multicast edge node is obtained self-adaptively based on the time domain analysis of the multicast service, thus the process of initiating a fast multicast tree and basic maintenance operations are completed.

In the practical application, there exist other situations, such as TCP connection fails or disconnects, Manager closes and a new fast multicast Agent launches, etc.. The present embodiment employs the following method to perform maintenance for the fast multicast system in different kinds of situations:

1) Manager sends out notification information periodically and refreshes the living timer of Manger for each individual Agent; if a new fast multicast Agent is initiated, it can also obtain the notification information from Manager and joins in the fast multicast system.

2) If the TCP connection between a certain Agent and Manager fails, then Manager deletes the records related to the Agent in the mapping table or sets it invalid, and does not send control information to said Agent any more.

3) When Manager closes, it must inform all the routers that said Manger has closed by closing notification information. However, in the present embodiment, when Manager closes, it does not delete the currently saved group address, multicast source address, Agent's IP address or the TCP connection mapping table. After Manger is restarted and establishes the TCP connection with Agent, Manager can index the mapping table through the IP address of Agent, and informs these Agents to initiate the fast multicast edge node functions of corresponding multicast service, which do not need to be obtained by adaptive studying of Agent for one cycle.

4) if Agent receives the closing notification from Manager, or the TCP connection with Manager disconnects, or the Manager timer in Agent exceeds the life time of Manager notified by Manager message, Agent will not send the time domain monitoring result to Manager until it receives a notification from Manager again.

Correspondingly, the management module Manager in fast multicast management server further comprises:

a notification information sending unit used to send Manager notification information to all the multicast configuration interfaces by using the multicast address of multicast routers as the destination address in multicast networks periodically after Manager has been launched, and notify all the routers in the multicast network when Manager is closed.

an edge node determination unit used to determine the fast multicast edge node of each individual multicast service in the next cycle according to the received time domain monitoring result obtained by each Agent within the current cycle.

a mapping table management unit used to build up a mapping table that includes the corresponding relationship among multicast service, edge node and TCP connection, update the mapping table in real time according to the determination result of the edge node, and obtain the edge nodes that will be invalid and newly added ones in the next cycle by comparison.

a static multicast member control unit used to send the control information for deleting static multicast member to the will-be-invalid edge nodes within the current cycle as well as to send the control information for launching static multicast member to the newly added edge nodes; when Manager is restarted, it is used to notify the Agent on these edge nodes to initiate fast multicast edge nodes functions of corresponding multicast service directly according to the saved edge node information in the mapping table.

The agent module Agent further comprises:

a connection establishment unit used to establish TCP connection with fast multicast TCP Server of Manager after the node has received Manger notification information and the multicast service has been initiated;

a time domain monitoring unit used to monitor the time domain distribution situation of the multicast service on the current multicast router during the time of Manger life period as well as the time when the connection between Agent and Manager works normally, and report the time domain monitoring result of the multicast service within the current cycle to Manager periodically;

a static multicast member configuration unit used to launch corresponding static multicast member when it has received the control information for initiating the static multicast member and the static multicast member of the multicast service is not initiated yet at the loopback interface; to delete corresponding static multicast member or set it invalid when it has received the control information for deleting static multicast member and the static multicast member of the multicast service has been initiated already at the loopback interface.

The above fast-multicast system can determine the edge node of the service in a real-time fashion based on the time domain monitoring result of the multicast service obtained by the router and can then initiate the static multicast member of said multicast service on said node, thus the time domain changes of multicast service can be fit, and the requirement for the utilization ratio of bandwidth can be met and at the meantime fast multicast can be realized.

The Second Embodiment

The present embodiment realizes fast multicast through the static shared tree multicast member Igmp_static_member (*, G) in multicast source tree environment (S, G). (S,G) environment may not always use static (S, G) member to realize fast multicast, since the network equipments that support (S, G) static multicast member must support SSM, while not all the (S, G) environments support SSM. In this case, the method in present embodiment can be used.

The present embodiment is similar to the method that the static shared tree multicast member Igmp_static_member (*, G) implements fast multicast in multicast shared tree environment. The differences lie in: (1) the edge node at which the static shared tree multicast member is launched by the fast multicast system is the edge node of the time domain overlapping sub-tree in the multicast source tree; (2) if it is the PIMSM multicast protocol, then it needs to firstly trigger multicast shared tree by the static shared tree multicast member and then switch the forwarding tree from multicast shared tree to multicast source tree through SPT switching; (3) the present embodiment determines the multicast edge nodes with reasonable multicast service through the pre-analysis of the demands for the user groups at each time period, and the static multicast member of multicast service is statically configured on these edge nodes, while it is determined in real time through the interaction between Manager and Agent in the first embodiment. However, it can set one or more valid time periods for the static multicast members and initiate the members within these periods, while set them invalid in other time. When no valid time period is set, all the time periods are considered to be valid.

The steps for realizing are as follows:

step A2, before the demand of multicast source service is initiated, the edge node of the time domain overlapping sub-tree in multicast source tree is determined based on the pre-analysis of the time domain for the multicast source tree;

As the operators that utilize fast multicast, a substantial portion of the locations of users who initiate the specific application in each time period can be known in advance. Taking IPTV application as an example, for the multicast nodes at each convergence layer, the launch time of application request of a specific multicast service (program) can be pre-estimated according to the purchased time periods of the users under the convergence node for the application. For the users that pre-purchase the application during non-predetermined-time period, if the multicast application initiated by the user is accepted by the operators, while at the same time, the branches of said multicast application tree do not cover the existing edge nodes, edge node functions can be initiated on the convergence layer router that is covered by said branch.

step B2, static shared multicast member is configured on said edge node, so that the interface that has been configured with said multicast member generates a request for the multicast shared tree service;

step C2, the request for the multicast shared tree service triggers the generation of multicast shared forwarding tree from said edge node to the root node of the multicast shared tree, so that the multicast shared tree service flow can be transmitted to said edge node in advance;

step D2, said edge node initiates the tree switching of RPT→SPT, so that the multicast tree can be switched from shared tree to source tree, therefore forming the source overlapping sub-tree from source S to the edge node;

step E2, the multicast service flow is transmitted to said edge node along the switched source overlapping sub-tree;

step F2, after sending out the request for multicast source tree service flow M_Traffic (S, G) through any receiver at said edge node, the multicast source tree path establishes the multicast forwarding tree from said receiver to said edge node, and the multicast source tree service flow is transmitted from said edge node to said receiver;

It can be seen that due to the function of the multicast member Igmp_static_member (*, G) of the static shared tree, the interface that has been configured with said group member maintains the request for the multicast source tree service during the existing time of the member configuration, therefore maintains the formed multicast source overlapping sub-tree, which in return ensures that the multicast source tree service flow can always been transmitted to the edge node of the source overlapping sub-tree, resulting in a reduction of the transmission distance (the number of hops) and delay of the multicast service flow, thus achieving the goal of fast multicast.

The Third Example fast multicast is implemented in multicast source tree environment (S, G) through the static source tree multicast member Igmp_static_member (S, G).

The static source tree multicast member Igmp_static_member (S, G) refers to the multicast member that maintain statically the existence of multicast source tree on the interface of a network equipment Router that supports IgmpV3. This multicast member functions the same as the ones that have been generated from IgmpV3 do, and it will always be valid as long as it is not deleted actively. When supporting SSM protocol, the static source tree multicast member can be initiated in advance on the edge node of the time domain overlapping sub-tree of multicast source tree, the existence of the multicast tree from the root node of multicast source tree to said edge node is triggered and maintained by said multicast member, and the multicast source tree service flow can be transmitted to said edge node in advance.

The fast multicast system and the determination method of the edge node in the present example is the same as in the first embodiment, the edge node of current multicast service is determined self-adaptively based on the interaction between Manager and Agent in the fast multicast system and the time domain monitoring result.

Steps for realizing are as follows:

step A3, before the request for multicast source tree service is initiated, the fast multicast system Manager finds out the edge node of the time domain overlapping sub-tree in multicast source tree based on the analysis for the time domain multicast source tree, and determines that this node supports SSM;

step B3, Manger initiates the static source tree multicast member on this node through Agent, so that the loopback interface that has initiated the multicast member generates the demand for multicast source tree service;

step C3, the request for the multicast source tree service triggers the generation of multicast source forwarding tree from said edge node to the root node of the multicast source tree, so that the multicast source tree service flow can be transmitted to said edge node in advance;

step D3, after sending out the request for multicast source tree service flow M_Traffic (S, G) through any receiver at said edge node, the multicast source tree path builds up the multicast forwarding tree from said receiver to said edge node, and the multicast source tree service flow is transmitted from said edge node to said receiver.

Based on the above embodiments, the present invention has other various solutions. For example, through the combination of the method that Manger's self-adaptive study obtains fast multicast edge node and the method that the multicast edge node of multicast service is configured statically by the pre-analysis for the time domain, the multicast service edge nodes obtained from the pre-analysis can be written into the Manager's mapping table or the static multicast member can be configured statically at these edge nodes, and thus, the static multicast member can be initiated on the edge nodes obtained from pre-analysis when the system is just powered on, and after a period of time, the edge nodes in the following cycle can determined based on the time domain monitoring result of Agent.

What we claim is:

1. A method of fast multicast, comprising the following steps of:
    (a) determining an edge node of a time domain overlapping sub-tree of multicast tree corresponding to multicast service based on analysis of the multicast service in time domain;
    (b) initiating a static multicast member of the multicast service on said edge node, so that an interface at which the static multicast member is initiated generates and maintains a request for the multicast service;
    (c) generating a first multicast forwarding tree from said edge node to a multicast root node through the overlapping sub-tree, so that a multicast service flow can be transmitted to said edge node in advance before a receiver sends out the request for the multicast service flow;
    (d) establishing a second multicast forwarding tree from the receiver to the edge node after the receiver sends out the request for the multicast service flow, so that the multicast service flow is transmitted from the edge node to the receiver;

wherein said step (a) comprises:
    (a1) setting a fast multicast management module in a multicast network and setting a fast multicast agent module on each multicast router;
    (a2) establishing an inter-connection as well as a group of fast multicast systems after said management module and agent module have been initiated;
    (a3) monitoring the time domain distribution of multicast services on the multicast router and reporting to the management module the time domain monitoring result of the multicast services periodically by the agent module in said group;
    (a4) determining and saving the edge node of each multicast service in a following cycle by the management module after it receives the time domain monitoring result of the multicast service.

2. The method of fast multicast in claim 1, wherein said multicast tree is a multicast shared tree and what is initiated on said edge node is a static shared tree multicast member.

3. The method of fast multicast in claim 1, wherein said multicast tree is a multicast source tree, said edge node supports source specific multicast and what is initiated is a static source tree multicast member.

4. The method of fast multicast in claim 1, wherein said multicast tree is a multicast source tree, what is initiated on the edge node in said step (b) is a static shared tree multicast member, and the interface at which the static multicast member is initiated generates a request for multicast shared tree service; moreover, between step (b) and step (c), there are also the following steps: the request of multicast shared tree service triggers the generation of a multicast shared forwarding tree from said edge node to the root node of multicast shared tree, so that the multicast shared tree service flow can be transmitted to said edge node in advance before the receiver at said edge node sends out a request for the multicast service flow, then said edge node initiates a switch from the multicast shared tree to the multicast source tree, resulting in a source overlapping sub-tree from said edge node to the source of the multicast source tree.

5. The fast multicast realization method in claim 1, wherein the static multicast member in said multicast service is statically configured with an available time period in which said static multicast member is initiated and out of which said static multicast member is canceled, on the edge node of the time domain overlapping sub-tree of the multicast tree corresponding to said multicast service.

6. The method of fast multicast in claim 1, wherein said step (b) can be further divided into the following steps of:
    (b1) comparing edge nodes of the multicast service of a current cycle and that of the following cycle and obtaining the edge nodes that will be invalid in the following cycle and newly added edge nodes by said management module;
    (b2) notifying agent modules on said newly added edge nodes to initiate the static multicast member of corresponding multicast service, as well as notifying the agent module on said edge nodes that will be invalid to cancel the static multicast member of the corresponding multicast service by said management module;
    (b3) executing corresponding operations by said agent module when it receives a notification of either initiating or canceling the static multicast member of the corresponding multicast service and determines that said static multicast member hasn't been initiated or cancelled yet.

7. The method of fast multicast in claim 6, wherein on said management module, a mapping table including a corresponding relationship among the multicast service, the edge node, and connection is established; in said step (b1), based on the determined edge node of each individual multicast service in the following cycle, said management module compares with the mapping table and obtains the edge nodes that will be invalid in the following cycle and the new ones that will be added, then updates the mapping table.

8. The method of fast multicast in claim 7, wherein when said management module closes, the current mapping table is maintained; when the management module restarts and builds up a connection with the agent modules, based on the saved edge node information in the mapping table, said management module notifies the agent modules of these edge nodes to initiate the static multicast member of corresponding multicast service in a launching table.

9. The method of fast multicast in claim 1, wherein in said step (a2), the management module in the multicast network multicasts management notification information periodically, and the management notification information comprises IP address and live time information of the management module; when said multicast router receives said notification information, it forwards the message while its agent module controls the establishment of the connection with said management module; in step (a3), said agent module only monitors and reports the time domain distribution during the life period of said management module as well as when the connection established between agent module and management module is normal.

10. The method of fast multicast in claim 1, wherein said static multicast member is initiated on a loopback interface.

11. A fast multicast system comprising at least one processor executing a management module and an agent module, wherein:
the management module exists in a fast multicast management server of the system and is configured to control and manage the fast multicast system, to determine an edge node of a time domain overlapping sub-tree of a multicast tree corresponding to multicast service based on analysis of the multicast service in time domain and initiate a static multicast member of multicast service on said edge node;
the agent module exists in all the multicast routers involved in the fast multicast system and is configured to execute fast multicast instructions of said management module as well as to feedback to the management module time domain monitoring information of the multicast service of the multicast router after a connection with the management module has been established;
wherein the agent module is configured to monitor the time domain distribution of multicast services on the multicast router and report to the management module the time domain monitoring result of the multicast services periodically;
the management module is configured to determine and save the edge node of each multicast service in a following cycle after receiving the time domain monitoring result of the multicast service.

12. The fast multicast system in claim 11, wherein said management module comprises:

an edge node determination unit configured to determine a fast multicast edge node of each individual multicast service in a following cycle according to the received time domain monitoring information of each agent module for the multicast service within a current cycle;
a mapping management unit configured to save corresponding relations among multicast service, edge node and the connection with agent module, update the corresponding relations in real time based on the determination result for the edge node, as well as obtain the edge nodes that will be invalid in the following cycle and the new ones that will be added by way of comparison;
a static multicast member control unit configured to send control information for deleting the static multicast member to the edge nodes that will be invalid within the current cycle, as well as to send control information for initiating the static multicast member to the newly added edge nodes.

13. The fast multicast system in claim 11, wherein said agent module comprises:
a connection establishment unit configured to connect said management module when the multicast service is initiated;
a time domain monitoring unit configured to monitor the time domain distribution of the multicast service on the current multicast router during a life period of said management module as well as when the connection established between agent module and management module is normal, and also to report to said management module the time domain monitoring information of the multicast service within the current cycle periodically;
a static multicast member configuration unit configured to initiate the corresponding static multicast member when a control information for initiating the static multicast member has been received but the static multicast member of said multicast service hasn't been initiated yet, and to delete corresponding static multicast member or set it invalid when a control information for deleting static multicast member has been received and the static multicast member of said multicast service has been initiated already.

14. The fast multicast system in claim 12, wherein said management module also comprises a notification information sending unit, which is configured to send management module notification information to all the multicast configuration interfaces by using multicast addresses of multicast router as destination addresses in the multicast network periodically, and to notify all the multicast routers in the multicast service network when the management module closes.

15. The fast multicast system in claim 13, wherein said agent module is configured to initiate the static shared member on the loopback interface.

16. The fast multicast system in claim 11, wherein when said management module is restarted, said edge node determination unit is also configured to notify agent modules of edge nodes to initiate the static multicast member of the corresponding multicast service based on the saved edge node information.

* * * * *